United States Patent
Mahe et al.

(10) Patent No.: US 6,687,770 B1
(45) Date of Patent: Feb. 3, 2004

(54) CONTROLLING CONSUMPTION OF TIME-STAMPED INFORMATION BY A BUFFERED SYSTEM

(75) Inventors: Jacques Mahe, Fremont, CA (US); Vincent Trinh, Pleasanton, CA (US); Michael Ignaszewski, Fremont, CA (US)

(73) Assignee: Sigma Designs, Inc., Milpitas, CA (US)

( * ) Notice: Subject to any disclaimer, the term of this patent is extended or adjusted under 35 U.S.C. 154(b) by 0 days.

(21) Appl. No.: 09/264,829

(22) Filed: Mar. 8, 1999

(51) Int. Cl.$^7$ .............................. G06F 3/00; G06F 13/28
(52) U.S. Cl. .............................. 710/53; 710/25; 710/29; 710/57
(58) Field of Search .................. 710/25, 29, 32–36, 710/45, 46, 52–58, 308; 370/389, 412

(56) References Cited

U.S. PATENT DOCUMENTS

| | | |
|---|---|---|
| 4,675,612 A | 6/1987 | Adams et al. |
| 4,713,621 A | 12/1987 | Nakamura et al. |

(List continued on next page.)

FOREIGN PATENT DOCUMENTS

| | | |
|---|---|---|
| WO | WO 9210911 A | 6/1992 |
| WO | WO 99/18714 | 4/1999 |

OTHER PUBLICATIONS

Asynchronous Error Queue Design for Error Recovery, IBM Technical Disclosure Bulletin, Nov. 1995.*
Machine vision system decouples . . . to disable and enable data transmission to host, and buffers to temporarily store data until allocation memory space by host, Derwent Information LTD 1999.*
Tsai Y T: "Color Image Compression For Single–Chip Cameras" IEEE Transactions on Electron Devices, vol. 38, No. 5, May 1, 1991, pp. 1226–1232, XP000200683, see abstract; figures 1,6.

Primary Examiner—Tim Vo
(74) Attorney, Agent, or Firm—Swernofsky Law Group PC

(57) ABSTRACT

Apparatus and methods, and computer program products are disclosed that accepts time-stamped information and feeds that information to a buffered system that consumes the information. The invention accepts an initial interval of the time-stamped information and when a pre-fill limit is reached, starts consumption of the data. The pre-fill limit is determined by monitoring the time stamp on the data that is ready to be consumed and the time stamp of data that has just been accepted. The difference between these time stamps provides an interval that represents the amount of time related to the data associated with the time-stamped information. Once the interval exceeds a pre-fill limit, the invention allows the buffered time-stamped information to be consumed. As the time-stamped information is consumed, the invention monitors the interval (other embodiments use the time stamp of data that is in the process of being consumed, or data that has just been consumed). If the interval falls below a lower limit, the invention stops consumption of the time-stamped information and waits for the interval to exceed a resume consumption trigger. Once the interval reaches the resume consumption limit the invention resumes consumption of the time-stamped information. This process continues until all the time-stamped information is consumed.

20 Claims, 3 Drawing Sheets

U.S. PATENT DOCUMENTS

| | | |
|---|---|---|
| 4,823,260 A | 4/1989 | Imel et al. |
| 4,876,660 A | 10/1989 | Owen et al. |
| 5,046,023 A | 9/1991 | Katsura et al. |
| 5,065,346 A | 11/1991 | Kawai et al. |
| 5,142,380 A | 8/1992 | Sakagami et al. .......... 358/432 |
| 5,151,875 A | 9/1992 | Sato |
| 5,231,492 A | 7/1993 | Dangi et al. |
| 5,276,807 A | 1/1994 | Kodama et al. |
| 5,309,111 A | 5/1994 | McNeely et al. |
| 5,397,853 A | 3/1995 | Koguchi |
| 5,471,576 A | 11/1995 | Yee |
| 5,528,309 A | 6/1996 | Nguyen ..................... 348/587 |
| 5,574,572 A | 11/1996 | Malinowski et al. ........ 358/451 |
| 5,638,130 A | 6/1997 | Linzer ........................ 348/445 |
| 5,650,824 A | 7/1997 | Huang ........................ 348/453 |
| 5,719,511 A | 2/1998 | Le Cornec et al. |
| 5,818,468 A | 10/1998 | Le Cornec et al. |
| 5,832,120 A | 11/1998 | Prabhakar et al. .......... 382/233 |
| 5,982,459 A | 11/1999 | Fandrianto et al. ....... 348/845.2 |
| 6,184,936 B1 | 2/2001 | Hu |
| 6,359,883 B1 * | 3/2002 | Lechleider .................. 370/389 |
| 6,504,845 B1 * | 1/2003 | Petersen et al. ............ 370/412 |
| 2001/0043282 A1 | 11/2001 | Hu |

* cited by examiner

CONTROLLING CONSUMPTION OF TIME-STAMPED INFORMATION BY A BUFFERED SYSTEM

BACKGROUND OF THE INVENTION

1. Field of the Invention

This invention relates to the field of buffered systems that process time-stamped information.

2. Background

Many buffered systems receive time stamped information or data. Portions of this data are stored in one or more buffers in the system. The data is consumed from the buffers. Thus, information (data) flows into the buffered system, is consumed at a rate dependent on the time stamp of the data, and the buffers in the buffered system help accumulate and match the presentation rate of the data with the incoming flow rate. The buffered system often consists of multiple components, each of which has buffer capability. The buffer capability of each component is often unknown to other components of the buffered system. Each component generally will stop accepting data from other components when the receiving component's buffers become full. Although this provides a level of flow-control, it does not provide information about the amount of data that may be buffered at any particular time. Some time-stamped information contains compressed data. This compressed data can be expanded back to its original size and take more buffer space than expected.

The time-stamped information is often used to drive presentation devices (such as audio or video devices) where the data needs to be presented in accordance with the time stamp to provide a smooth presentation and where the time stamp is used to synchronize the audio and video presentations.

One problem, related to presenting time-stamped information when the rate the data is being accepted by the buffered system is less than the rate the data is being consumed from the buffered system, is how best to pause and resume the consumption (presentation) of the information. In the case of video information, displaying each video frame (or small grouping of frames) as the frame is received, has the affect of a series of still pictures instead of a moving image. Thus, some amount of data is initially buffered until a sufficient amount of data is available. At this point the buffered data is consumed until the system becomes starved for additional data. When the system starves, it pauses the consumption of data (pauses the presentation) until the buffered system accumulates enough data to resume consumption.

In the case of time-stamped information, where the amount of data per time-stamped interval can be highly variable (for example, the MPEG format), it is difficult to determine how much of the presentation is present in the buffered system. Thus, it is difficult to determine whether enough information has been received to begin the consumption of the information; difficult to determine when to pause the consumption of the information; and difficult to determine when to resume the consumption of the information.

For time-stamped information, the relevant measure of the amount of data that is buffered is not how much space is taken in the buffers by the data making up the information, but rather the amount of presentation time that exists in the buffers.

It would be advantageous to treat the amount of information in the buffered system not as the amount of space used by the data, or as a percentage of the available buffer space in the buffered system but as an interval of time that represents how much presentation time is buffered in the system. Thus, instead of attempting to monitor buffer usage in the buffered system, determining compressed and uncompressed storage requirements, and making start, pause, and resume decisions based on buffer space, these decisions are more simpler and more efficient when made using the size of the interval of presentation.

SUMMARY OF THE INVENTION

One embodiment of the invention accepts time-stamped information and feeds that information to a buffered system that consumes the information. The invention accepts an initial interval of the time-stamped information and when a pre-fill limit is reached, starts consumption of the information. The pre-fill limit is determined by monitoring the time stamp on the information that is ready to be consumed and the time stamp of information that has just been accepted. The difference between these time stamps provides an interval that represents the amount of time related to the buffered data associated with the time-stamped information. Once the interval exceeds a pre-fill limit, the invention allows the buffered time-stamped information to be consumed. As the time-stamped information is consumed, the invention monitors the interval (other embodiments use the time stamp of data that is in the process of being consumed, or data that has just been consumed). If the interval falls below a lower limit, the invention stops consumption of the time-stamped information and waits for the interval to exceed a resume consumption trigger. Once the interval reaches the resume consumption limit the invention resumes consumption of the time-stamped information. This process continues until all the time-stamped information is consumed.

One aspect of the invention is a method that includes the step of monitoring an interval that represents the amount of time-stamped information stored within a buffered system. The method also includes steps of adding the time-stamped information to the buffered system and of consuming the time-stamped information from the buffered system. In addition the method detects when the interval is less than a lower limit and, in that case, stops consumption of the time-stamped information from the buffered system. The method also detects when the interval has reached a resume consumption trigger and accordingly resumes consumption of the time-stamped information from the buffered system.

Another aspect of the invention is an apparatus that includes an interval monitoring mechanism that is configured to monitor an interval representing the amount of time-stamped information stored within a buffered system. The apparatus also includes a receiver mechanism that is configured to add the time-stamped information to the buffered system and a data processing mechanism configured to consume the time-stamped information from the buffered system. The apparatus uses a low limit detection mechanism to detect when the interval is less than a lower limit and a pause mechanism configured to stop consumption of the time-stamped information from the buffered system responsive to the low limit detection mechanism. When the consumption is stopped, a resume detection mechanism detects when the interval has reached a resume consumption trigger. The apparatus also includes a resumption mechanism that resumes consumption of the time-stamped information from the buffered system responsive to the resume detection mechanism.

Yet a further aspect of the invention is a computer program product embodied in a computer usable medium. When executed on a computer, the computer readable code causes a computer to effect an interval monitoring mechanism, a receiver mechanism, a data processing mechanism, a low limit detection mechanism, a pause mechanism, a resume detection mechanism, and a resumption mechanism. Each of these mechanisms having substantially the same functions as the corresponding mechanisms for the previously described apparatus.

DESCRIPTION OF THE PREFERRED EMBODIMENTS

Figure 1:
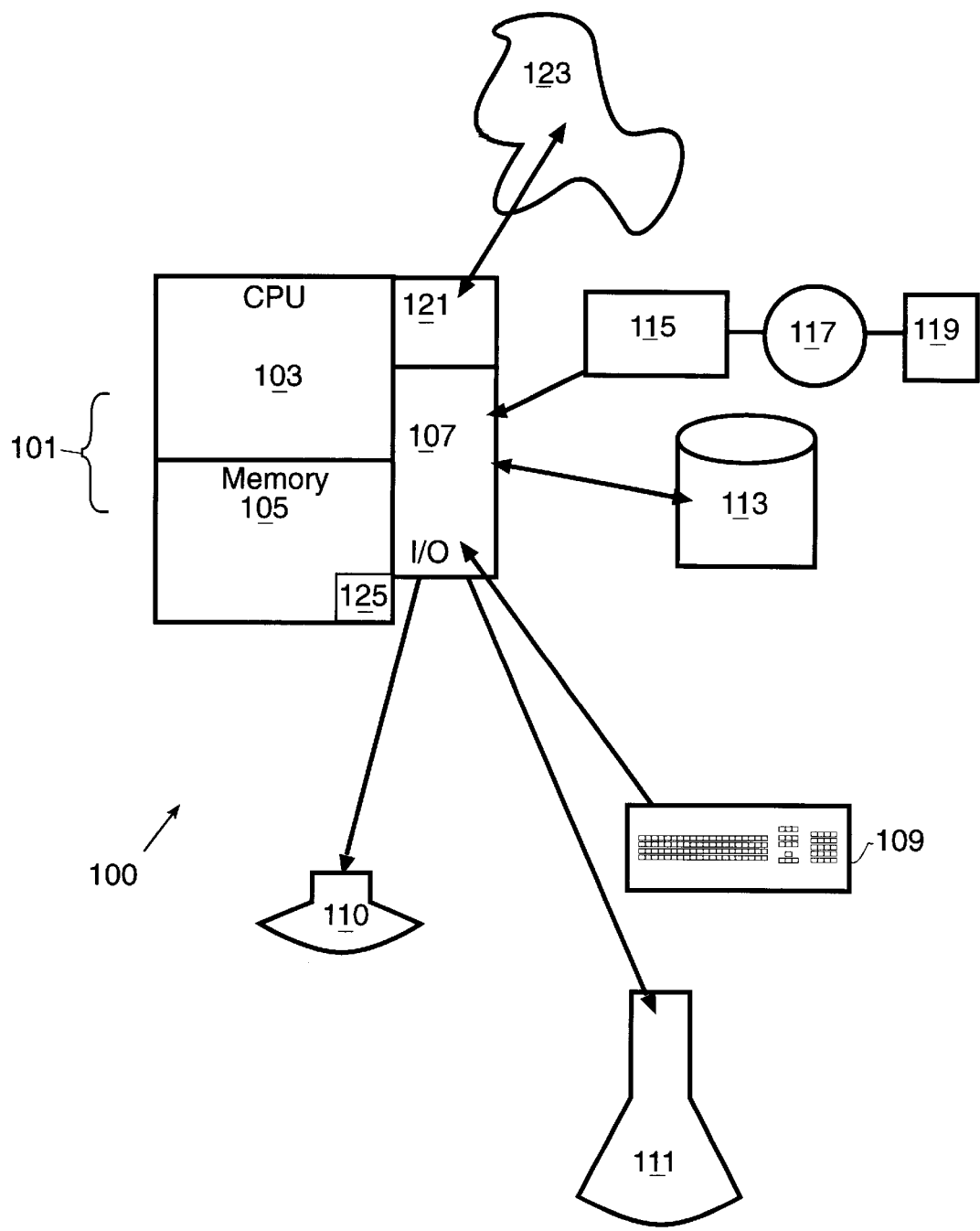
FIG. 1 illustrates a computer system capable of using the invention in accordance with a preferred embodiment.

FIG. 1 illustrates a computer, indicated by general reference character 100, that incorporates the invention. The computer 100 includes a processor 101 that incorporates a central processor unit (CPU) 103, a memory section 105 and an input/output (I/O) section 107. The I/O section 107 is connected to a keyboard 109, a speaker unit 110, a display unit 111, a disk storage unit 113, and a CD-ROM drive unit 115 using respective interfaces (not shown). The CD-ROM drive unit 115 can read a CD-ROM medium 117 that typically contains a executable code and/or data 119 or MPEG formatted data. The CD-ROM drive unit 115 (along with the CD-ROM medium 117) and the disk storage unit 113 comprise a filestorage mechanism. Some embodiments of the invention include a network interface 121 that connects the computer 100 to a network 123. An 'application program' 125 can be loaded from the filestorage mechanism or from the network 123. The 'application program' 125 causes the computer 100 to perform the steps of the invention. One skilled in the art will understand that not all of the displayed features of the computer 100 need to be present for the invention; that the CD-ROM drive unit 115 provides a mechanism for reading removable media and thus can be replaced by any other drive that is capable of reading compatible removable media; and that the invention can be practiced by customized logic that implements the steps of the invention.

Figure 2:
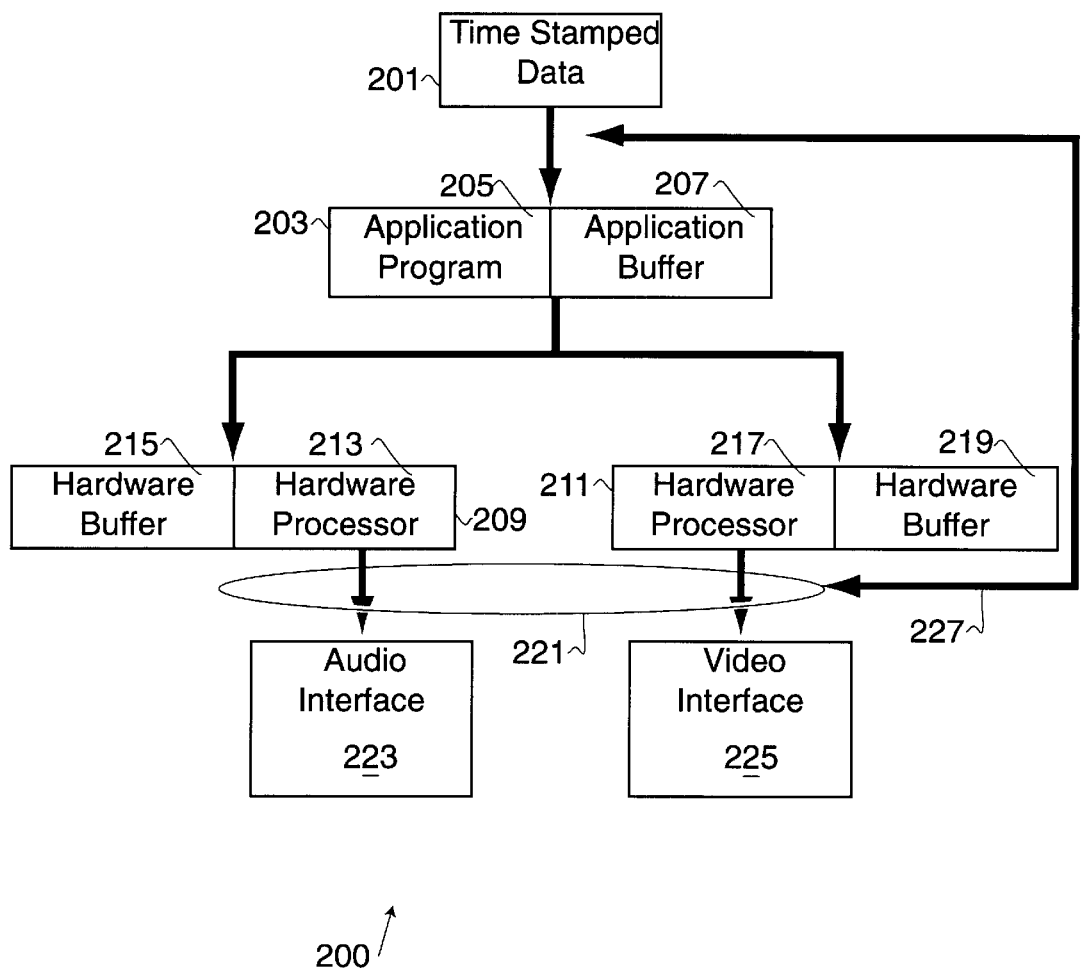
FIG. 2 illustrates a buffered system in accordance with a preferred embodiment.

FIG. 2 illustrates a buffered system, indicated by general reference character 200, that accepts time-stamped information 201. The system can include a computer program 203 (or custom logic that also performs the function of the computer program 203). The computer program 203 includes a computer instruction portion 205 containing computer program code and a buffer portion 207 used to store portions of the time-stamped information 201 when those portions are being processed by the computer instruction portion 205. Where the time-stamped information 201 is MPEG data, it will often contain a video and audio portion, both of which are time stamped to allow the presentation of the video and audio data streams to be synchronized. In such a circumstance, the computer program 203 separates the audio and video portions of the time-stamped information 201 into a time-stamped audio stream and a time-stamped video stream. The time-stamped audio stream is sent to an audio interface 209 while the time-stamped video stream is sent to a video interface 211. The audio interface 209 includes an audio processor 213 and an audio data buffer 215. The audio data buffer 215 buffers some of the time-stamped audio stream that will be processed by the audio processor 213. The video interface 211 includes a video processor 217 and a video data buffer 219. The video data buffer 219 buffers some of the time-stamped video stream that will be processed by the video processor 217. The audio interface 209 and the video interface 211 use the time stamps in the data streams to maintain a time synchronized data flow 221 that synchronizes the presentation of audio and video data on an audio interface 223 and an video interface 225 respectively. An interval monitor 227 monitors the time-stamp of the time-stamped information 201 entering the buffered system 200 and the time synchronized data flow 221 being consumed by the buffered system 200 to determine an interval. The interval represents how much data is stored in the system measured in time units. The interval monitor 227 can be implemented by comparing the time stamp of information entering the buffered system with the information leaving (ready to leave, or just left) the buffered system.

Because the invention monitors the amount of presentation time stored in the buffered system instead of the amount of data stored in the system, the invention can make decisions based on concrete human-observable values (such as the presentation time period for the information stored in the buffered system) instead of abstract values such as the amount of data stored in the buffered system. Thus, the invention need not know the actual buffer sizes in the buffered system and need not track the percentage of buffer used to store the information.

When the time-stamped information 201 is MPEG data, the amount of data required to define each frame widely varies between frames. Thus, using an interval instead of the amount of data stored in the buffered system provides a more "tangible" representation of the measure.

Figure 3A:
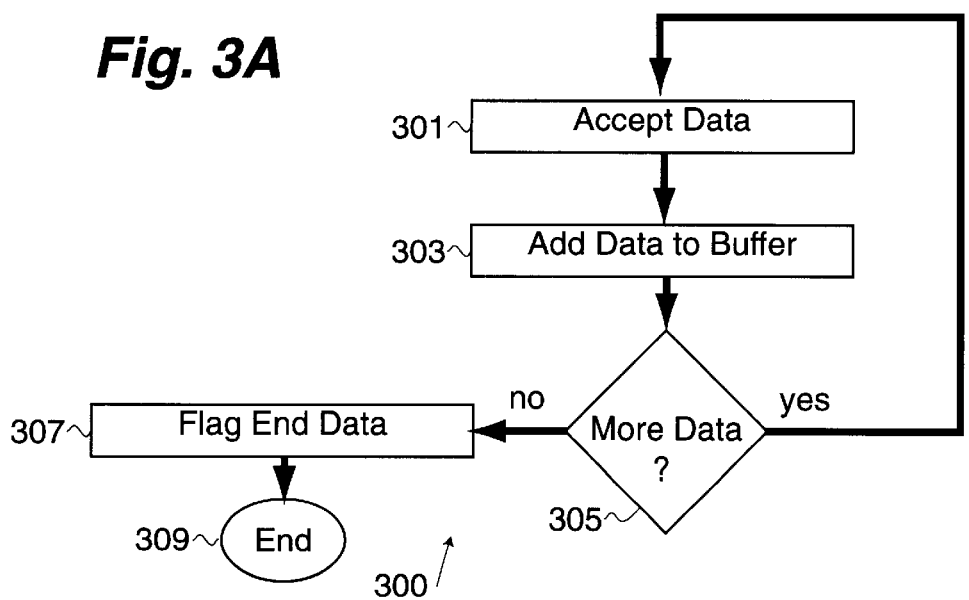
FIG. 3A illustrates an 'acquire data' process in accordance with a preferred embodiment.

FIG. 3A illustrates an 'acquire data' process, indicated by general reference character 300, that continues to accept data for as long as the data is in the process of being provided. The 'acquire data' process 300 starts at an 'accept data' step 301 that receives a portion of the time-stamped information 201. Once this information is accepted, the 'acquire data' process 300 continues to an 'add data to buffer' step 303 that adds the just accepted data to the buffered system. Once the data is in the system, it can be consumed and processed. As the data is consumed, the interval is monitored as described with respect to FIG. 3B. Once the data is added to the buffered system, an 'additional data' decision step 305 determines whether the time-stamped information 201 has been completely received. If not, the 'acquire data' process 300 continues back to the 'accept data' step 301 to continue receiving the time-stamped information 201. However, if the 'additional data' decision step 305 determines that the time-stamped information 201 has been completely accepted, the 'acquire data' process 300 continues to a 'flag end data' step 307 that raises an end data flag, which indicates that the time-stamped information 201 has been completely received. The 'acquire data' process 300 completes through an 'end' terminal 309.

Figure 3B:
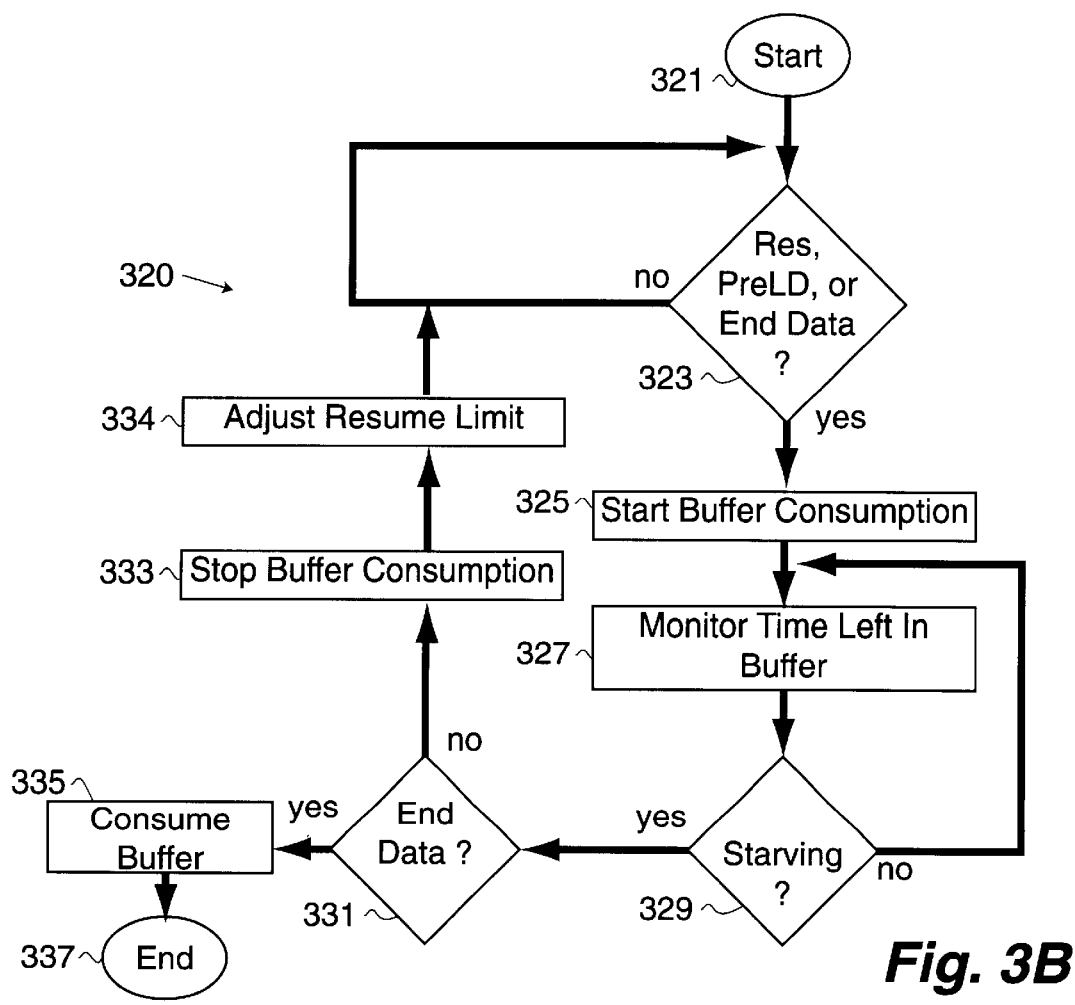
FIG. 3B illustrates a 'consume data' process in accordance with a preferred embodiment.

FIG. 3B illustrates a 'consume data' process, indicated by general reference character 320 that initiates at a 'start' terminal 321 after a portion of the time-stamped information 201 has been accepted by the 'accept data' step 301 of FIG. 3A. The 'acquire data' process 300 runs concurrently with the 'consume data' process 320 so that data can be added to the buffered system while prior data is being consumed and the interval is being monitored. A 'buffer loaded' decision step 323 determines whether the buffered system has reached a pre-fill limit or if the end data flag has been raised. If neither of these conditions hold, the 'consume data' process 320 repeats to the 'buffer loaded' decision step 323.

The interval of the buffered data is determined by the time stamps included within the time-stamped information 201. Thus, for example, as the 'consume data' process 320 initiates, the time stamp of the first data loaded into the buffered system is captured. As subsequent portions of the time-stamped information 201 is loaded into the buffered system, time stamp of first data is subtracted from the time stamp of the newly loaded information (such as just-accepted information) to determine the interval of the buffered information in units of time. Another embodiment allows the time-stamped information to flow through the buffered system until the information reaches a presentation device (where it is blocked, ready for consumption, until the presentation is started). The interval can be determined by subtracting the time stamp read from the ready to be consumed data at the presentation device from the time stamp of recently accepted information (for example, information that has just been accepted, that was last accepted, or information accepted within some timeframe of the last accepted information).

If the 'buffer loaded' decision step 323 determines that that the buffer has reached a pre-fill limit or if the end data flag has been raised, the 'buffer loaded' decision step 323 continues to a 'start buffer consumption' step 325. The pre-fill limit is used to accept a sufficient amount of the time-stamped information 201 so that when presentation of the information is initiated, the presentation will run for an appropriate amount of time (for at least as long as the pre-fill limit minus the lower limit). During this time, additional time-stamped information 201 will be received, buffered and presented so long as the interval in the buffer does not indicate starvation (when the interval is less than the lower limit as is subsequently described).

The 'start buffer consumption' step 325 performs operations that starts consumption, of the accepted portions of the time-stamped information 201. This can include sending buffered portions of the time-stamped information 201 to other devices or processes for subsequent processing (for example, the audio interface 209 and/or the video interface 211). These other devices generally include their own buffers. They also generally provide a means for providing the time stamp of the portion of the time-stamped information 201 that is in the process of being presented (or the portion that was last presented or the portion that will next be presented).

A 'monitor time in buffer' step 327 evaluates the amount of information in all the buffers in the system by subtracting the time stamp of the currently consumed (presented) information from the time stamp of the a recently accepted portion of information by the 'accept data' step 301. The currently consumed information can be determined directly from the presentation device and can be the time stamp of the just consumed data, the ready to be consumed data or the data currently being consumed. Thus, the 'monitor time in buffer' step 327 monitors an interval that represents the amount of the time-stamped information 201 that is stored in all the buffers in the buffered system.

A 'starving' decision step 329 uses the interval to determine whether the 'consume data' process 320 is starving for data (for example, but without limitation, when the time measure of data in the buffers is less than a lower time limit). If the 'consume data' process 320 is not starving for data, it continues to the 'monitor time in buffer' step 327 to continue to monitor the interval (the amount of time left in the buffered system).

However, if the 'starving' decision step 329 determines that the 'consume data' process 320 is starved for data (that is, whether the interval left in the buffers falls to or below the lower time limit (which can be zero)) the 'consume data' process 320 continues to an 'end data' decision step 331. The 'end data' decision step 331 checks the end data flag that was possibly set by the 'flag end data' step 307. If the end data flag was not set, the 'consume data' process 320 continues to a 'stop buffer consumption' step 333. The 'stop buffer consumption' step 333 stops the consumption of the buffered data from the buffered system that was started by the 'start buffer consumption' step 325. The consumption can be stopped by pausing the presentation of the buffered information by the audio interface 209 and the video interface 211. In a preferred embodiment the 'consume data' process 320 continues to an 'adjust resume consumption trigger' step 334 that dynamically adjusts the resume consumption trigger dependent on a fill rate that indicates how fast the time-stamped information 201 is being accepted by the 'acquire data' process 300. One skilled in the art will understand that in some circumstances the 'consume data' process 320 may not need to include the 'adjust resume consumption trigger' step 334 as the trigger value can remain constant.

The 'consume data' process 320 continues to the 'buffer loaded' decision step 323 to continue accepting the time-stamped information 201 until the interval reaches a resume consumption trigger or the end of data is detected. In a preferred embodiment, the pre-fill limit has the same value as the resume consumption trigger. Once the 'buffer loaded' decision step 323 is satisfied, the 'consume data' process 320 resumes consumption of the time-stamped information 201 from the buffers at the 'start buffer consumption' step 325.

Thus when the 'consume data' process 320 starves, the presentation of the information is halted until enough information is accepted to allow the presentation to continue in a useful way. This results in longer pauses between continuous periods of presentation of the data and more uniform periods of presentation.

If the 'end data' decision step 331 determines that the end data flag has been set (which indicates that the time-stamped information 201 has been completely received) the 'consume data' process 320 continues to a 'consume buffer' step 335 that consumes all the data in the buffers without monitoring for starvation. Once the data in the buffers is completely consumed the 'consume data' process 320 terminates through an 'end' terminal 337.

One skilled in the art will understand that the invention can be implemented in many different ways. For example in one embodiment, one of the audio interface 209 and the video interface 211 can have a register that receives the time stamp of recently accepted information. The interface can then include circuitry to perform the previously described functions. In another embodiment, the previously described functions are performed whenever data is consumed. Another embodiment periodically (for example, responsive to an operating system timer function) performs the previously described functions.

One skilled in the art will understand that if a gap occurs in the time-stamped information 201 (for example, due to data being dropped, or because of incorrectly time-stamped data) that the invention can detect the gap, signal pause the consumption of data until sufficient information is received to meet the trigger value.

One skilled in the art will understand that the invention provides for a time based determination of when to pause and resume consumption of time-stamped information that is received by a buffered system.

From the foregoing, it will be appreciated that the invention has (without limitation) the following advantages:

1) More consistent presentation intervals of the time-stamped information.
2) Better detection of the starvation condition.
3) Buffer calculations that do not directly depend on the amount of data received, the rate that data is received, or the buffer sizes of system elements. Thus, buffer calculations can be performed if the above information is not available.
4) Accurate determination of the amount (in time) of information buffered in the system.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed is:

1. A method including steps of:
   monitoring an interval representing the amount of time-stamped information stored within a buffered system:
      adding said time-stamped information to said buffered system;
      consuming said time-stamped information from said buffered system;
      detecting when said interval is less than a lower limit;
      stopping consumption of said time-stamped information from said buffered system responsive to said step of detecting when said interval is less than said lower limit;
   detecting when said interval has reached a resume consumption trigger; and
   resuming consumption of said time-stamped information from said buffered system responsive to said step of detecting when said interval has reached a resume consumption trigger.

2. The method of claim 1 wherein said interval is determined by subtracting a first time stamp associated with a ready for consumption portion of said time-stamped information from a second time stamp associated with a recently accepted portion of said time-stamped information.

3. The method of claim 1 wherein said interval is determined by subtracting a first time stamp associated with a recently consumed portion of said time-stamped information from a second time stamp associated with a recently accepted portion of said time-stamped information.

4. The method of claim 1 wherein said time-stamped information is MPEG information.

5. The method of claim 1 further includes steps of:
   preloading said buffered system without starting consumption of said time-stamped information until said interval exceeds a pre-fill limit; and
   starting consumption of said time-stamped information from said buffered system.

6. The method of claim 1 wherein said buffered system has an unknown amount of available buffer.

7. The method of claim 1 wherein said resume consumption trigger is dynamically adjusted dependent on a fill rate indicative of how fast the step of adding adds said time-stamped information to said buffered system.

8. The method of claim 5 wherein said pre-fill limit is the same value as said resume consumption trigger.

9. An apparatus including:
   an interval monitoring mechanism configured to monitor an interval representing the amount of time-stamped information stored within a buffered system;
   a receiver mechanism configured to add said time-stamped information to said buffered system;
   a data processing mechanism configured to consume said time-stamped information from said buffered system;
   a low limit detection mechanism configured to detect when said interval is less than a lower limit;
   a pause mechanism configured to stop consumption of said time-stamped information from said buffered system responsive to the low limit detection mechanism;
   a resume detection mechanism configured to detect when said interval has reached a resume consumption trigger responsive to the pause mechanism; and
   a resumption mechanism configured to resume consumption of said time-stamped information from said buffered system responsive to the resume detection mechanism.

10. The apparatus of claim 9 wherein said interval is determined by subtracting a first time stamp associated with a ready for consumption portion of said time-stamped information from a second time stamp associated with a recently accepted portion of said time-stamped information.

11. The apparatus of claim 9 wherein said interval is determined by subtracting a first time stamp associated with a recently consumed portion of said time-stamped information from a second time stamp associated with a recently accepted portion of said time-stamped information.

12. The apparatus of claim 9 wherein said time-stamped information is MPEG information.

13. The apparatus of claim 9 further including:
   a pre-load mechanism configured to pre-load said buffered system without starting consumption of said time-stamped information until said interval exceeds a pre-fill limit; and
   an initiation mechanism configured to start consumption of said time-stamped information from said buffered system.

14. The apparatus of claim 9 wherein said buffered system has an unknown amount of available buffer.

15. The apparatus of claim 9 including an adjust trigger mechanism configured to dynamically adjust said resume consumption trigger dependent on a fill rate indicative of how fast the receiver mechanism adds said time-stamped information to said buffered system.

16. The apparatus of claim 9 wherein the data processing mechanism is an audio presentation device.

17. The apparatus of claim 9 wherein the data processing mechanism is a video presentation device.

18. The apparatus of claim 13 wherein said pre-fill limit is the same value as said resume consumption trigger.

19. A computer program product including:
   a computer usable storage medium having computer readable code embodied therein, said computer readable code including;

computer readable program code configured to cause said computer to effect an interval monitoring mechanism configured to monitor an interval representing the amount of time-stamped information stored within a buffered system;

computer readable program code configured to cause said computer to effect a receiver mechanism configured to add said time-stamped information to said buffered system;

computer readable program code configured to cause said computer to effect a data processing mechanism configured to consume said time-stamped information from said buffered system;

computer readable program code configured to cause said computer to effect a low limit detection mechanism configured to detect when said interval is less than a lower limit;

computer readable program code configured to cause said computer to effect a pause mechanism configured to stop consumption of said time-stamped information from said buffered system responsive to the low limit detection mechanism;

computer readable program code configured to cause said computer to effect a resume detection mechanism configured to detect when said interval has reached a resume consumption trigger responsive to the pause mechanism; and computer readable program code configured to cause said computer to effect a resumption mechanism configured to resume consumption of said time-stamped information from said buffered system responsive to the resume detection mechanism.

20. The computer program product of claim 19 wherein said interval is determined by subtracting a first time stamp associated with a ready for consumption portion of said time-stamped information from a second time stamp associated with a recently accepted portion of said time-stamped information.

* * * * *